United States Patent
Balasubramanya

(10) Patent No.: US 10,274,130 B2
(45) Date of Patent: Apr. 30, 2019

(54) CARRIER DEVICE

(71) Applicant: DE-STA-CO Europe GmbH, Oberursel (DE)

(72) Inventor: Hanagal Manjunath Balasubramanya, Bangalore (IN)

(73) Assignee: DE-STA-CO Europe GmbH, Oberursel (DE)

( * ) Notice: Subject to any disclaimer, the term of this patent is extended or adjusted under 35 U.S.C. 154(b) by 0 days.

(21) Appl. No.: 13/978,953

(22) PCT Filed: Jan. 2, 2013

(86) PCT No.: PCT/DE2013/100000
§ 371 (c)(1),
(2) Date: Sep. 23, 2014

(87) PCT Pub. No.: WO2013/102457
PCT Pub. Date: Jul. 11, 2013

(65) Prior Publication Data
US 2015/0108309 A1 Apr. 23, 2015

(30) Foreign Application Priority Data

Jan. 8, 2012 (DE) ........................ 10 2012 100 103

(51) Int. Cl.
*F16M 13/02* (2006.01)
*B25J 15/00* (2006.01)
(Continued)

(52) U.S. Cl.
CPC ........ *F16M 13/022* (2013.01); *B25J 15/0052* (2013.01); *B25J 15/0061* (2013.01);
(Continued)

(58) Field of Classification Search
CPC ....... F16M 11/14; F16M 11/2078; F16C 7/06; F16C 11/06; F16C 11/106; B25J 15/0052; B25J 15/0061; B25J 15/06; B25J 15/0616
(Continued)

(56) References Cited

U.S. PATENT DOCUMENTS 2,530,478 A * 11/1950 Parent ...................... A61J 9/06
248/103
2,652,221 A * 9/1953 Kampa ................... B60R 1/078
248/276.1
(Continued)

FOREIGN PATENT DOCUMENTS

DE 4305667 A1 8/1993
DE 4230838 A1 3/1994
(Continued)

OTHER PUBLICATIONS

The Free Dictionary, definition of strap, retrieved Jun. 26, 2017, http://www.thefreedictionary.com/strap.*
(Continued)

*Primary Examiner* — Jonathan Liu
*Assistant Examiner* — Guang H Guan
(74) *Attorney, Agent, or Firm* — Harness, Dickey & Pierce, P.L.C.

(57) ABSTRACT

A carrier device has a support frame (1), a tubular carrier element (2), a first connecting element (3) at one end of the carrier element (2) and a second connecting element (4) at the other end of the carrier element (2). The first connecting element (3) is connected with the support frame (1), via a clip collar element (5). The second connecting element (4) is connected with a manipulation element (7), via a ball joint (6). The first connecting element (3) is connected with the clip collar element (5), via a ball joint (8). The carrier element (2) is designed as a continuous tube from one end
(Continued)

to the other. The carrier element (2) can be inserted and clamped securely in tubular clamping elements (9) arranged on the carrier element side of the two connecting elements (3,4).

6 Claims, 2 Drawing Sheets

(51) Int. Cl.
*F16C 11/06* (2006.01)
*F16M 11/14* (2006.01)
*F16M 11/20* (2006.01)
*F16C 11/10* (2006.01)
*F16C 7/06* (2006.01)

(52) U.S. Cl.
CPC ............... *F16C 7/06* (2013.01); *F16C 11/06* (2013.01); *F16M 11/14* (2013.01); *F16M 11/2078* (2013.01); *F16C 11/106* (2013.01)

(58) Field of Classification Search
USPC ..... 248/276.1, 278.1, 279.1, 288.31, 288.51, 248/230.4, 316.5, 103; 403/90, 128, 141, 403/143; 414/729, 737, 751.1, 752.1, 414/797; 269/21, 75
See application file for complete search history.

(56) References Cited

U.S. PATENT DOCUMENTS

| | | | | |
|---|---|---|---|---|
| 2,711,872 A * | 6/1955 | Lampke | ............... | A61J 9/06 248/103 |
| 2,950,836 A * | 8/1960 | Murdock | ............ | A24F 19/0092 131/241 |
| 3,180,604 A * | 4/1965 | Hammer | ............... | G03B 42/025 248/205.8 |
| 4,312,336 A * | 1/1982 | Danieletto | ......... | A61B 17/6458 403/137 |
| 4,382,572 A * | 5/1983 | Thompson | ................ | B60R 1/04 248/224.51 |
| 4,676,800 A * | 6/1987 | Chen | ........................ | A61F 2/76 403/61 |
| 4,735,388 A * | 4/1988 | Marks | ....................... | A61J 9/06 248/103 |
| 4,836,485 A * | 6/1989 | Cooper | ................... | B60R 11/00 224/553 |
| 5,187,744 A * | 2/1993 | Richter | ............... | B60R 11/0241 224/553 |
| 5,269,486 A * | 12/1993 | Hufford | ................ | F16B 7/0486 248/231.61 |
| 5,383,738 A | 1/1995 | Herbermann | | |
| 5,419,522 A * | 5/1995 | Luecke | ................. | F16C 11/106 248/288.51 |
| 5,482,239 A * | 1/1996 | Smith | ....................... | A61G 5/10 248/229.13 |
| 5,909,998 A * | 6/1999 | Herbermann | ........ | B21D 43/055 414/752.1 |
| 5,921,694 A | 7/1999 | Herbermann | | |
| 6,059,245 A * | 5/2000 | Hermansen | .............. | B62J 11/00 248/311.2 |
| 6,138,970 A * | 10/2000 | Sohrt | ..................... | F16M 11/10 248/278.1 |
| 6,220,556 B1 * | 4/2001 | Sohrt | .................... | F16C 11/106 248/278.1 |
| 7,156,358 B2 * | 1/2007 | March | ...................... | B60R 1/04 248/481 |
| 7,367,740 B2 * | 5/2008 | Lazic | ..................... | F16C 11/10 248/125.1 |
| 7,753,330 B2 * | 7/2010 | Brief | ................... | B60R 11/0241 248/278.1 |
| 7,798,546 B2 * | 9/2010 | Kniss | ................... | B25J 15/0052 294/65 |
| 7,891,619 B2 | 2/2011 | Perlman | | |
| 7,959,120 B2 * | 6/2011 | Liao | ..................... | B60R 11/0252 248/122.1 |
| 8,162,557 B2 * | 4/2012 | Van Zile, III | ........ | B25J 15/0052 403/385 |
| 8,408,955 B2 * | 4/2013 | Boebel | .................... | B63H 20/10 248/640 |
| 8,534,951 B2 * | 9/2013 | Komine | ................ | F16C 11/106 248/288.51 |
| 8,857,877 B2 * | 10/2014 | Lin | ...................... | B25J 15/0061 269/71 |
| 2010/0012814 A1 * | 1/2010 | Boebel | .................. | B63H 20/10 248/640 |
| 2015/0108309 A1 * | 4/2015 | Balasubramanya | ........................ | F16M 11/2078 248/276.1 |
| 2018/0003337 A1 * | 1/2018 | Migliori | .................. | F16M 11/14 |

FOREIGN PATENT DOCUMENTS

| | | |
|---|---|---|
| DE | 9407862 U1 | 9/1995 |
| DE | 29705023 U1 | 7/1998 |
| EP | 1992827 A2 | 11/2008 |
| EP | 2147 854 A1 | 1/2010 |
| GB | 2368520 A | 5/2002 |

OTHER PUBLICATIONS

International Search Report and Written Opinion of the ISA for PCT/DE2013/100000, ISA/EP, Rijswijk, NL, dated Apr. 22, 2013 (11 pages).
German Search Report for priority document DE 10 2012 100 103.0, dated Dec. 6, 2012 (6 pages).

* cited by examiner

CARRIER DEVICE

CROSS-REFERENCE TO RELATED APPLICATIONS

This application is a 371 U.S. National Phase of PCT International Application PCT/DE2013/100000 filed on Jan. 2, 2013. This application claims the benefit and priority of DE 1020121001030, filed Jan. 8, 2012. The entire disclosures of each of the above applications are incorporated herein by reference.

FIELD

The disclosure relates to a carrier device and, more particularly, to a carrier device with a support frame, a tubular carrier element, a first connecting element and a second connecting element wherein the first connecting element is connected with a clip collar element, via a ball joint, and the carrier element is designed as a continuous tube from one end to the other.

BACKGROUND

A carrier device is known from EP 1 995 827 B1. It consists of a support frame, a tubular carrier element, a first connecting element at one end of the carrier element and a second connecting element at the other end of the carrier element. The first connecting element is connected with the support frame via a clip collar element. The second connecting element is connected with a manipulation element via a ball joint.

The carrier device according to the EP 1 995 827 B1 is connected, as shown in the figures of the documents, with a supporting frame, not shown, via the clip collar element marked with the reference symbol 16. Here the carrier element consists of two tubular elements that can be telescopically extended/retracted in relation to each other. In the figures a solution is shown where the carrier element always extends at right angles to a tube of the supporting frame. Additionally other embodiments are known where the carrier element extends at a 30° or 45° angle in relation to the tube of the supporting frame. In these cases, the connecting element between the clip collar element and the carrier element is designed to extend appropriately at the angle. Furthermore a manipulation element, such as a suction cup or similar, not shown, is provided on the ball joint marked as 18.

A carrier device of this kind is used, in particular, in production processes. A plurality of carrier elements is normally arranged on the supporting frame. The device as a whole is used, for example, to transport large metal plates from one tool to the next. The to be moved metal plate is held by several suction cups that are distributed at appropriate points across the overall surface.

The solution according to EP 1 992 827 B1 is a workable solution, but its weight and poor flexibility are unfavourable.

For the sake of completeness reference is also made to DE 297 05 023 U1. Here, an adjustable linkage with a clamping element is known. In this adjustable linkage, although ball joints are provided on both sides, the carrier element is neither configured as one piece nor is it sufficiently stable in order to bear the load of heavy metal plates. Further there are no clamping elements on the carrier element side of the connecting elements.

In addition reference is made to GB 2 368 520 A. Here, the carrier element is not implemented as a tube extending from one end to the other end. Also, on the side of the carrier element, it can not be plugged in and fixed to tubular clamping elements arranged on both connecting elements. Rather this solution comprises three telescopically extendable tubes that are plugged into each other. A first tube is connected with the first ball head and has a second tube plugged into it. In turn, the second tube has a third tube plugged into it. The third tube is connected with the second ball head.

Further, reference is made to DE 43 05 667 B4. Here neither a carrier frame is provided nor a strap element, let alone any tubular clamping elements enclosing the carrier element.

SUMMARY

The disclosure is based on the requirement to improve a carrier device, of the kind mentioned above, in particular with regard to its weight and flexibility. According to the disclosure, a carrier device is provided that overcomes the deficiencies of the prior art.

According to the disclosure, the first connecting element is connected with the clip collar element via a ball joint. The carrier element is designed as a continuous tube from one end to the other. Thus, the carrier element can be inserted and clamped securely in the tubular clamping elements arranged on the carrier element side of the two connecting elements.

Further, according to the disclosure, the carrier element can now be pivoted on both sides about a ball joint. Thus, due to the tubular clamping elements, there is no longer any need for an expensive telescopic solution.

With the carrier device according to EP 1 992 827 B1, the connecting element, without the ball joint, can only be attached in one angle position to the supporting frame. For a different angle it is necessary, as already mentioned, to attach another connecting element on the carrier element. Moreover, the torsion-proof telescope solution is too heavy, in particular, for modern assembly lines. Due to its high inertia moment, the carrier device cannot be moved fast enough with respect to the high indexing rates that are required.

According to the present disclosure, the carrier device can be attached afterwards to the supporting frame. Further, due to its increased flexibility of the second ball joint, the carrier device can be adjusted to suit the circumstances. Previously, this was not possible due to the predefined angle elements, thus, for a modified requirement, the entire carrier device had to be regularly dismantled and reassembled from scratch.

In addition and as explained in more detail below, a certain longitudinal adjustability (telescopic extendibility) is automatically ensured due to the tubular clamping elements. The one-piece tubular carrier element can be quickly cut to the required length, for example by sawing, should the need arise.

Other advantageous further developments of the carrier device according to the disclosure are revealed in the disclosure and claims.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The carrier device according to the disclosure including its advantageous further developments will now be described in detail with reference to the drawings representing different embodiments, in which.

DETAILED DESCRIPTION OF THE DRAWINGS

Figure 1:
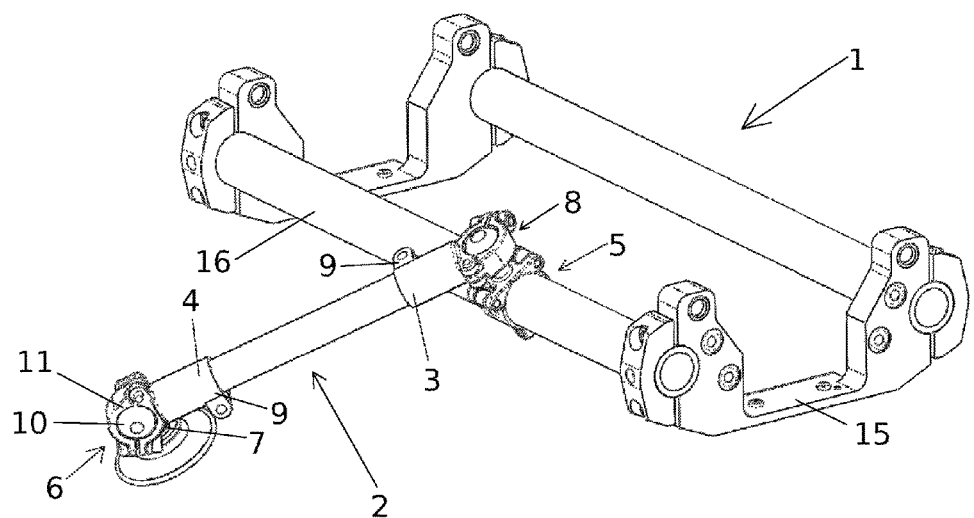
FIG. 1 is a perspective view of a first embodiment of the carrier device with a supporting frame and one carrier element.
Figure 3:
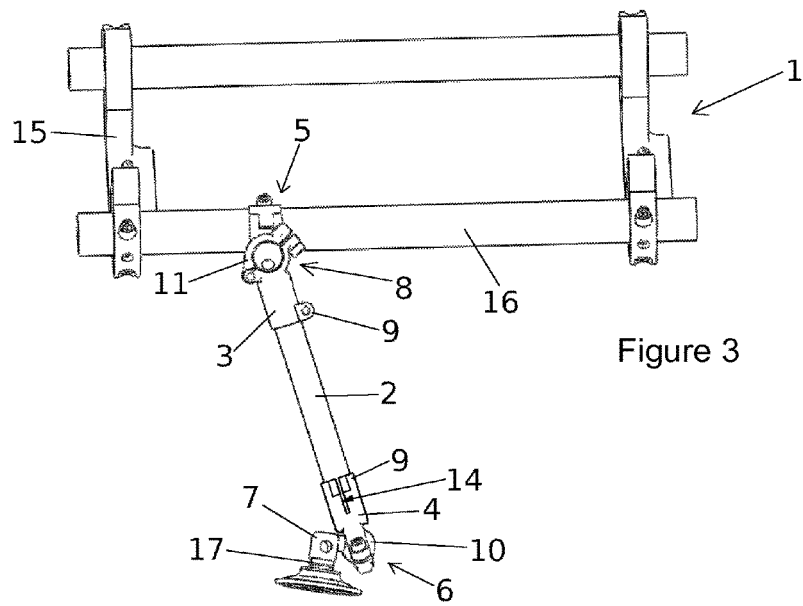
FIG. 3 is a top view of a further supporting frame with a carrier element in a different position with reference to FIG. 1.

The carrier device shown in FIGS. 1 and 3 includes a supporting frame 1, a tubular carrier element 2, a first connecting element 3 at one end of the carrier element 2 and a second connecting element 4 at the other end of the carrier element 2. The first connecting element 3 is connected with the support frame 1, via a clip collar element 5. The second connecting element 4 is connected with the manipulation element 7, via a ball joint 6. The embodiments according to FIGS. 1 and 3 are different. In particular, they differ with regard to the arrangement of the carrier element on the supporting frame and with regard to the alignment of the carrier element in relation to the supporting frame.

Figure 2:
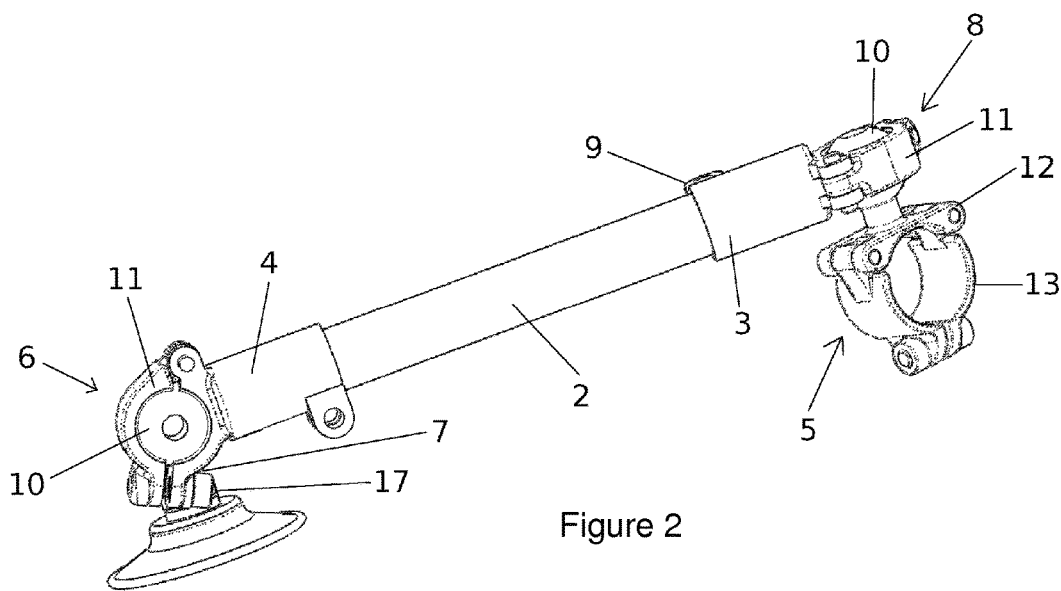
FIG. 2 is a perspective view of the carrier element according to FIG. 1.
Figure 4:
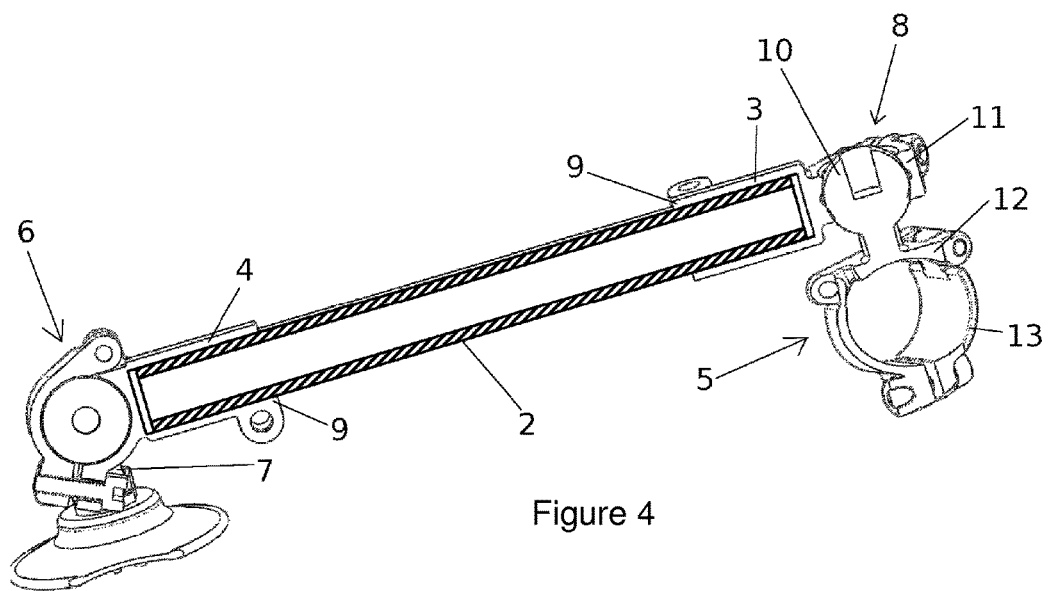
FIG. 4 is a partial section view of the one-piece carrier element.

FIGS. 2 and 4 each show a carrier element 2 without the supporting frame 1. The carrier element 2 is designed as a round tube that is hollow inside. But tubes that are not circular in cross-section can, of course, also be considered.

It is essential to all embodiments of the carrier device according to the disclosure that the first connecting element 3 is connected with the clip collar element 5, via a ball joint 8. Also, the carrier element 2 is designed as a continuous tube from one end to the other. Thus, the carrier element 2 can be inserted and clamped securely in tubular clamping elements 9. The clamping elements 9 are arranged on the carrier element side of the two connecting elements 3, 4. Screws or similar items are required for bracing the clamping element 9 and are not shown in FIGS. 1 to 4, for better clarity.

As explained above, the three requirements "ball joint", "one-piece tube" and "adjustability within the clamping elements" that belong together, result in a considerably more flexible solution compared to the known prior art. Thus, for equal stability it is much easier to use especially for higher indexing speeds.

As revealed in FIGS. 1 to 4, it is especially preferable if the ball joint 6, 8 includes a ball head 10 and a clamp 11, matching the ball head 10.

With this arrangement, the clamping element 9 of the connecting element 3, 4 may optionally have the ball head 10 or the clamp 11 arranged on it. The especially preferred and shown alternative is that the clamp 11 is adjoined to the clamping element 9, that is, it is connected to the same. In other words, the tubular clamping element 9 is integrally connected with one of the two parts of the ball joint 6, 8.

Furthermore the ball head 10 or the clamp 11 is optionally arranged on the clip collar element 5 or the manipulation element 7. Again with reference to FIGS. 1 to 4, a ball head 10 is arranged on the clip collar element 5 and on the manipulation element 7.

As also revealed in the figures, it is especially preferable if the first connecting element 3 is designed in (exactly) the same way as the second connecting element 4. This requirement considerably reduces the cost of storing the carrier device. Thus, exactly identical connecting elements 3, 4 can be used on both the support frame side and on the manipulation element side.

In addition, in order to keep the costs for the components of the carrier device, according to the disclosure, low, it is preferable that optionally the clip collar element 5, the connecting elements 3, 4 and/or the manipulation element 7 are designed as forgings or castings.

In order to realise the above mentioned requirement "adjustability within the clamping elements" the tubular carrier element 2 within the tubular clamping element 9 is fixable in different axial positions. For a non-braced clamping element 9, the tubular carrier element 2 is designed so as to be axially movably mounted within the clamping element 9. To this end the tubular clamping element 9 comprises, on the connecting element 3, 4, a tensioning slot 14 and a mechanism for bracing (not shown, as mentioned) the clamping element 9 against the tubular carrier element 2. As revealed in FIG. 4, it is possible in this way to vary, within certain limits, the distance between the two connecting elements 3 and 4, which in particular are defined by the length of the clamping elements 9. An available insertion length on the clamping element 9 for the carrier element 2 would then be equal, at least to one-and-a-half times the diameter of the carrier element 2.

The clip collar element 5 includes a base 12 that has a shank 13 arranged on it. The shank 13 is pivotable relative to the base 12. The shank 13 can be braced against the base 12 and the support frame 1. As revealed in the figures, the base 12 also includes the ball head 10 arranged on it on the support frame side.

The support frame 1 includes a linking element 15 for linking it to an actuation device (for example a robot). This linking element may be for example configured as a perforated plate or the like.

To link between the support frame 1 and the carrier element 2, the support frame 1 includes a tubular connecting area 16. The tubular connecting area 16 links the clip collar element 5. The clip collar element 5 is designed to enclose a circular in cross-section portion of the connecting area 16.

Finally, the manipulation element 7 includes a linkage area 17 to optionally connect a sucker or a suction cup (shown), a gripper (not shown), a tensioning device (not shown) or a so-called scoop (not shown).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A carrier device comprising:
   a support frame with a tubular connecting arm and a connecting link;
   a tubular carrier element having a first end and a second end;
   a first connecting element at the first end of the carrier element;
   a second connecting element at the second end of the carrier element;
   the first connecting element is connected with a tubular connecting area of the tubular connecting arm via a clip collar element surrounding a portion of the tubular connecting area, and the second connecting element is connected with a mechanism for manipulation of an object to be held by the mechanism from one position to another, via a first ball joint mechanism, the first connecting element is connected with the clip collar element via a second ball joint mechanism; and the carrier element is designed as a one piece continuous tube from the first end to the second end, each of the first and second connecting elements includes a tubular clamping element with an open end and a closed end, each of the first and second ends of the tubular carrier element is inserted into the open end of the tubular clamping element of a respective one of the first and second connecting elements and terminates in the tubular clamping element of the respective one of the first and second connecting elements, each of the first and second connecting elements extends from a corresponding one of the first and second ball joint mechanisms, each ball joint mechanism includes a ball head and a clamp, either the ball head of each ball joint mechanism or the clamp of each ball joint mechanism is directly integrally connected with and extends from the closed end of the tubular clamping element of a corresponding one of the first and second connecting elements, the first and second ball joint mechanisms enabling multiple degrees of freedom positioning of the first and second connecting elements so that the carrier device is adapted to be adjusted.

2. The carrier device according to claim 1, wherein the ball head of the first ball joint mechanism is arranged on the mechanism for manipulation of the object, and the ball head of the second ball joint mechanism is arranged on the clip collar element.

3. The carrier device according to claim 1, wherein the tubular carrier element within the tubular clamping elements of the first and second connecting elements is fixable in different axial positions with respect to the tubular clamping elements of the first and second connecting elements.

4. The carrier device according to claim 1, wherein the clip collar element includes a base, with at least one shank arranged pivotable relative to the base, and the at least one shank is adapted to be braced against the base and the tubular connecting area.

5. The carrier device according to claim 1, wherein the first connecting element is identical to the second connecting element.

6. A carrier device comprising:
a support frame with a tubular connecting arm and a connecting link;
a tubular carrier element having a first end and a second end;
a first connecting element at the first end of the carrier element;
a second connecting element at the second end of the carrier element;
the first connecting element is connected with a tubular connecting area of the tubular connecting arm via a clip collar element surrounding a portion of the tubular connecting area, and the second connecting element is connected with a mechanism for manipulation of an object to be held by the mechanism from one position to another, via a first ball joint mechanism, the first connecting element is connected with the clip collar element via a second ball joint mechanism; and the carrier element is designed as a one piece continuous tube from the first end to the second end, and each of the first and second ends of the tubular carrier element is an open end, each of the first and second connecting elements has a tubular clamping element, the first and second ends of the tubular carrier element are, respectively, inserted into and terminate in the tubular clamping elements of the first and second connecting elements, the tubular clamping element of each of the first and second connecting elements extends from a corresponding one of the first and second ball joint mechanisms, each ball joint mechanism includes a ball head and a strap clamp arranged about a peripheral surface of the ball head, either the ball head of each ball joint mechanism or the strap clamp of each ball joint mechanism is directly integrally connected with and projects from a closed end of the tubular clamping element of a corresponding one of the first and second connecting elements, the first and second ball joint mechanisms enabling multiple degrees of freedom positioning of the first and second connecting elements so that the carrier device is adapted to be adjusted.

* * * * *